United States Patent
Fin et al.

(10) Patent No.: US 6,988,759 B2
(45) Date of Patent: Jan. 24, 2006

(54) MULTI-CONFIGURATION VEHICLE DOOR SYSTEM

(75) Inventors: Enrico Fin, Lake Orion, MI (US); Kristine Weaver, Clarkston, MI (US); Gopi Krishnan, Troy, MI (US); Dominique Benoit, St. Jean le Blanc (FR); Thierry Pebre, Checy (FR)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 10/804,438

(22) Filed: Mar. 19, 2004

(65) Prior Publication Data

US 2005/0110298 A1    May 26, 2005

Related U.S. Application Data

(60) Provisional application No. 60/525,084, filed on Nov. 25, 2003.

(51) Int. Cl.
  *B60J 5/00*    (2006.01)
(52) U.S. Cl. ............................. 296/146.7; 296/146.2; 296/145
(58) Field of Classification Search ............ 296/146.7, 296/146.2, 146.5, 138, 145; 49/502
  See application file for complete search history.

(56) References Cited

U.S. PATENT DOCUMENTS

| | | | |
|---|---|---|---|
| 5,033,236 A | 7/1991 | Szerdahelyi et al. | |
| 5,379,553 A | 1/1995 | Kimura et al. | |
| 5,829,195 A | 11/1998 | Ojanen | |
| 5,867,942 A * | 2/1999 | Kowalski | 49/502 |
| 5,927,021 A | 7/1999 | Kowalski et al. | |
| 6,036,255 A | 3/2000 | Lester et al. | |
| 6,036,256 A * | 3/2000 | Hilliard et al. | 296/148 |
| 6,231,112 B1 | 5/2001 | Fukumoto et al. | |
| 6,612,641 B2 | 9/2003 | Schutt et al. | |
| 6,820,919 B2 * | 11/2004 | Florentin et al. | 296/146.6 |

* cited by examiner

*Primary Examiner*—Stephen Gordon
(74) *Attorney, Agent, or Firm*—Carlson, Gaskey & Olds

(57) ABSTRACT

A modular door system provides a lower door assembly, an upper door assembly and a trim assembly. The upper door assembly is selectively removable and replaceable such that the door system is readily converted between a multiple of configurations. The trim assembly includes the interior vehicle door trim and a hinged trim portion. The hinged trim portion is defined by a trim hinge which is generally parallel to the open edge. By pivoting the hinged trim portion away from the open edge, the cavity is readily exposed for receipt of the upper door assembly. The difference in thickness of the upper door assembly is accommodated by pivoting of the hinged trim portion to permit passage of the components while still providing a seal for the cavity when the hinged trim portion is secured.

12 Claims, 4 Drawing Sheets

MULTI-CONFIGURATION VEHICLE DOOR SYSTEM

BACKGROUND OF THE INVENTION

The present application claims priority to U.S. Provisional Patent Application Ser. No. 60/525084, filed Nov. 25, 2003.

The present invention relates to a vehicle door, and more particularly to a multi-functional vehicle door system having a common door lower.

Some vehicles include multiple door configurations that may be utilized in various environments. Such configurations typically include a rigid full door with a movable window, a door with a soft upper portion that often includes a zip out portion, a half-door, and complete door removal.

Numerous conventional vehicle door designs provide assembly arrangements such that the door may be converted from one configuration to another. A lower door housing portion of the door structure typically carries a window regulating mechanism which displaces a window panel. The lower door housing portion also includes door closure systems such as latches to secure the door to the vehicle body. Such mechanisms complicate reconfiguration of the door.

One modular door generally includes a lower door housing defining a cavity adapted to receive a glass panel and an upper cassette including a housing carrying a track for displaceably mounting the glass panel with respect to the upper housing and a regulator for controlling displacement of the glass panel along the track. The cassette is removably attached as a unit to the lower door housing to selectively expose the passenger compartment through a large portion of the door opening in the vehicle body and to permit substitution of a soft upper door portion.

One disadvantage with such a modular door is sealing the cavity when various upper door portions are attached thereto. Typically, additional seal components and the like are attached to the cavity opening to seal the selected upper door housing to the lower door housing. Such additional seal components may complicate changeover for an end user.

Accordingly, it is desirable to provide an uncomplicated modular door system that is readily converted between configurations.

SUMMARY OF THE INVENTION

The modular door system according to the present invention provides a lower door assembly, an upper door assembly and a trim assembly. The upper door assembly is selectively removable and replaceable such that the door system is readily converted between a multiple of configurations The upper door portion is selected from one of a door cassette and a side curtain assembly. The lower door assembly generally includes an inner panel and an outer panel mounted to a frame that defines a cavity to receive one of the upper door portions through an open edge.

The trim assembly includes interior vehicle door trim and a hinged trim portion. The hinged trim portion is defined by a trim hinge which is generally parallel to the open edge. By pivoting the hinged trim portion away from the open edge, the cavity is readily exposed for attachment of the upper door assembly. The difference in thickness of the upper door assembly is accommodated by pivoting of the trim portion to permit passage of various thickness components while still providing a seal of the cavity when the hinged trim portion is secured.

The present invention therefore provides an uncomplicated modular door system that is readily converted between configurations.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
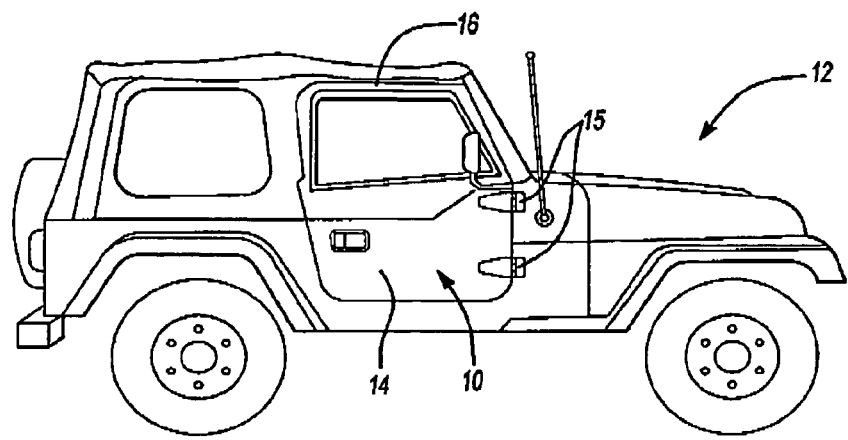
FIG. 1 is a side view of an exemplary vehicle incorporating a door system constructed in accordance with the present invention.

FIG. 1 illustrates a general perspective view of a door system 10 for a vehicle 12. It should be understood that various vehicles would benefit from the present invention. The vehicle door system 10 generally includes a lower door assembly 14 and an upper door assembly 16. The upper door assembly 16 is preferably selectively removable and replaceable such that the door system 10 is readily converted between a multiple of configurations. It should be understood that relative positional terms such as "forward," "aft," "upper," "lower," "above," "below," and the like are with reference to the normal operational attitude of the vehicle and should not be considered otherwise limiting.

The lower door assembly 14 includes a hinge arrangement 15 or the like which permits the door system 10 to pivotally attached to the vehicle 12 in a conventional manner.

Figure 2:
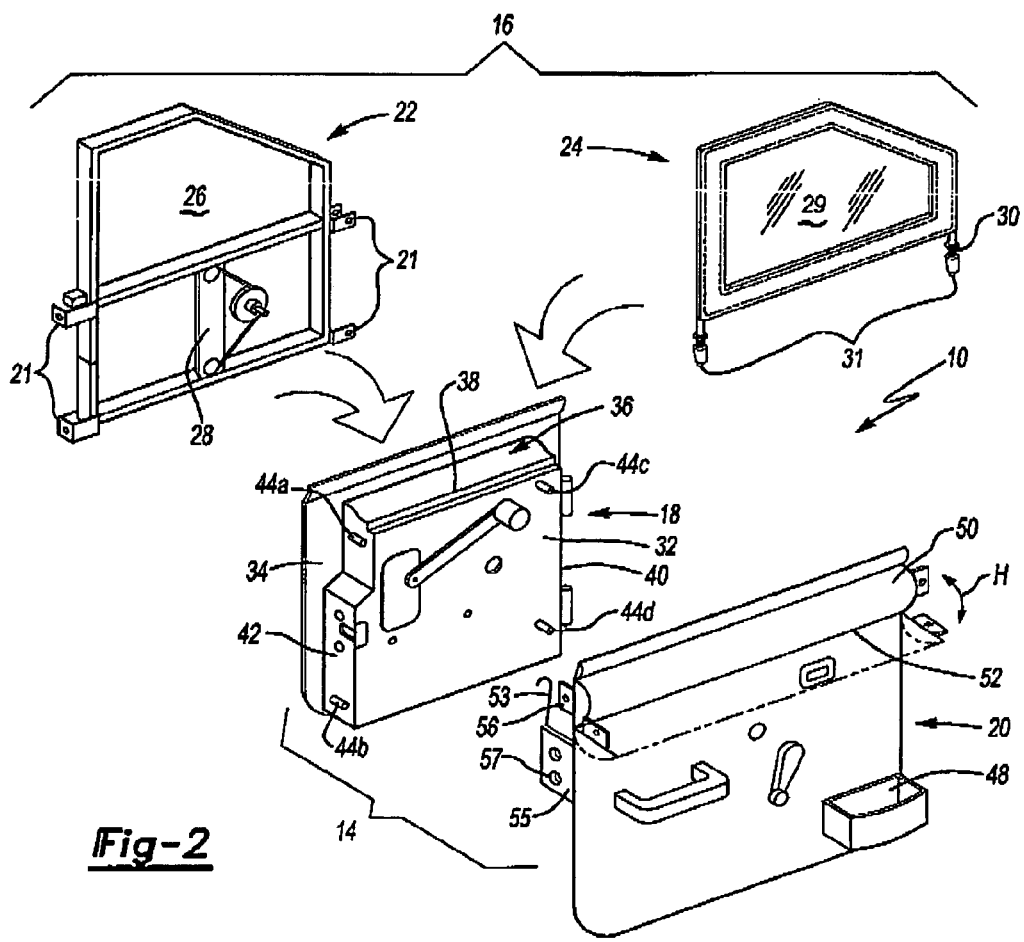
FIG. 2 is an exploded perspective view of a modular door assembly of the present invention.

Referring to FIG. 2, the door system 10 generally includes the lower door assembly 14 which includes a door frame 18 and a trim assembly 20. The upper door assembly 16 is selected from at least one of a door cassette 22 and a side curtain assembly 24. It should be understood that other upper door portions 16 along with no upper door assembly 16 will also benefit from the present invention.

The door cassette 22 includes a movable glass window 26 and drive arrangement 28. The door cassette 22 is primarily of a rigid construction. The door cassette 22 includes attachments 21 to secure the door cassette 22 to the lower door assembly 14.

The curtain assembly 24 includes a soft canvas and clear plastic window 29 mounted over a frame 30. The curtain assembly 24 is primarily of a soft construction. The frame 30 defines attachments 31 to secure the curtain assembly 24 to the lower door assembly 14.

Figure 3:
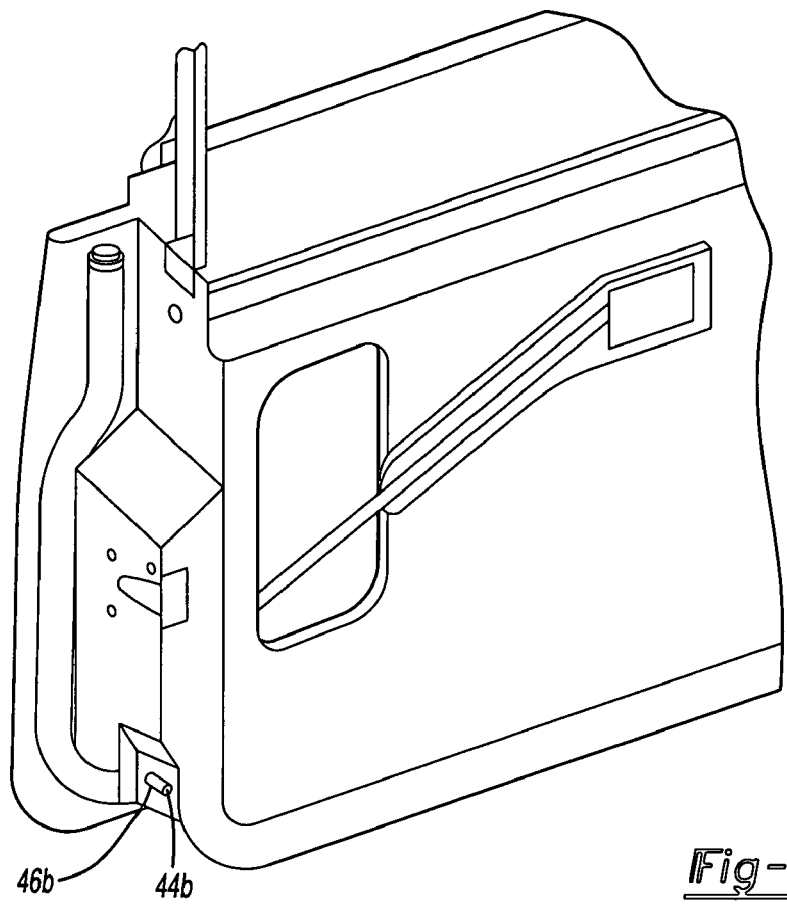
FIG. 3 is a perspective end view of the modular door assembly showing one possible arrangement to accommodate latch and related rods or cables within the door assembly.

The lower door assembly 14 generally includes an inner panel 32 and a door outer panel 34 mounted to the frame 18. The frame 18 defines a cavity 36 which receives one of the upper door assembly 16 along an open edge 38. A front face 40 and a rear face 42 of the frame 18 includes fastener apertures 44a–d, receive a fastener 46 such as a bolt (FIG. 3). Preferably, the bolt heads are exposed along the faces 40, 42 for access and aesthetic reasons.

The trim assembly 20 includes the interior vehicle door trim (illustrated schematically at 48) and a hinged trim portion 50, plus hardware elements needed for various functions of the door, such as latch and related rods or cables, inside door handle, etc. The trim assembly 20 is secured to the door frame 18 with a hook 53 and attachment 55 arrangement which permits the trim to be readily removed and secured to the door frame 18 by an end user.

The hinged trim portion 50 is defined by a trim hinge 52 which is generally parallel to the open edge 38. The trim hinge 52 is preferably a living hinge which permits the trim portion to pivot about the trim hinge 52 (illustrated by arrow H). By pivoting the hinged trim portion 50 away from the open edge 38, the cavity 36 is readily exposed for passage of the door cassette 22 and any associated components such as the window drive arrangement 28.

The glass window 26 and the soft canvas and clear plastic window assembly 29 are of generally the same thickness but the drive arrangement 28 required to guide and move the glass window 26 is significant thicker. This difference in thickness is accommodated by pivoting of the hinged trim portion 50 to permit passage of the thicker components.

Figure 4:
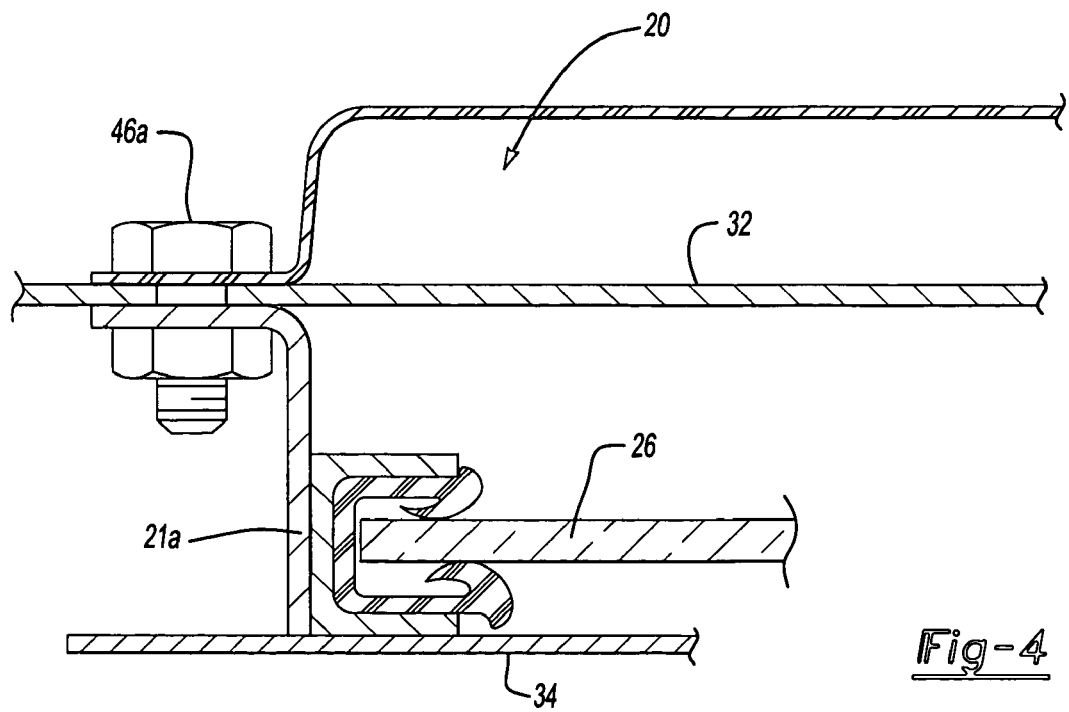
FIG. 4 is a sectional view of the rear attachment of the door cassette to the door frame.

Referring to FIG. 4, the fastener 46a secures the attachment 21a to an upper portion of the frame 18 adjacent the door inner panel 32 to secure the curtain assembly 24 to the lower door assembly 14. Preferably, fastener apertures 44a and 44b are slots to receive fasteners 46a and 46b respectively.

Figure 5:
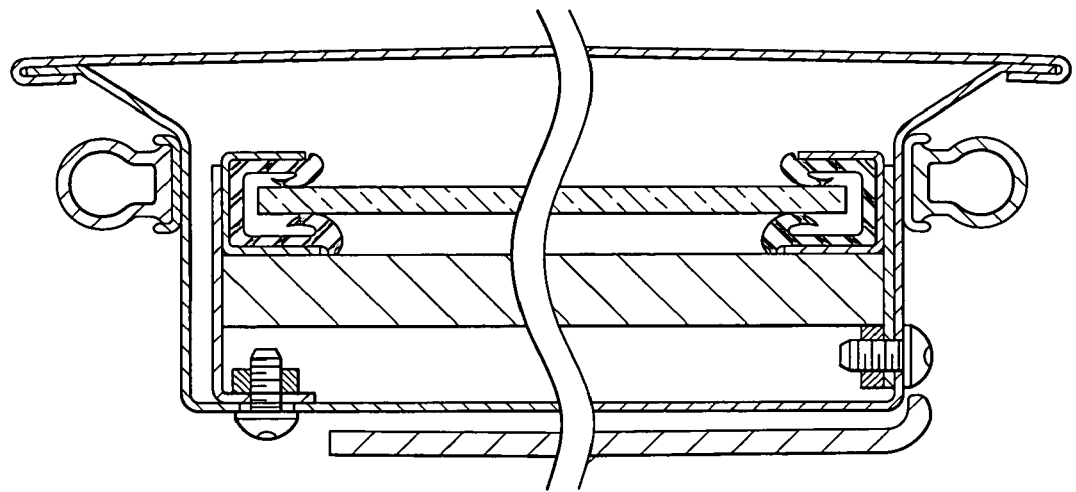
FIG. 5 is a sectional view of the front attachment of the door cassette to the door frame.

Referring to FIG. 5, fasteners 46c and 46d secure the attachments 21c and 21d to the front portion of the door frame 18 when the cassette 22 is located within the cavity 36. Preferably, the fastener aperture 46c is located within a recess 52 in the front face of the door frame 18 to provide clearance for the fasteners 46c and 46d.

Figure 6:
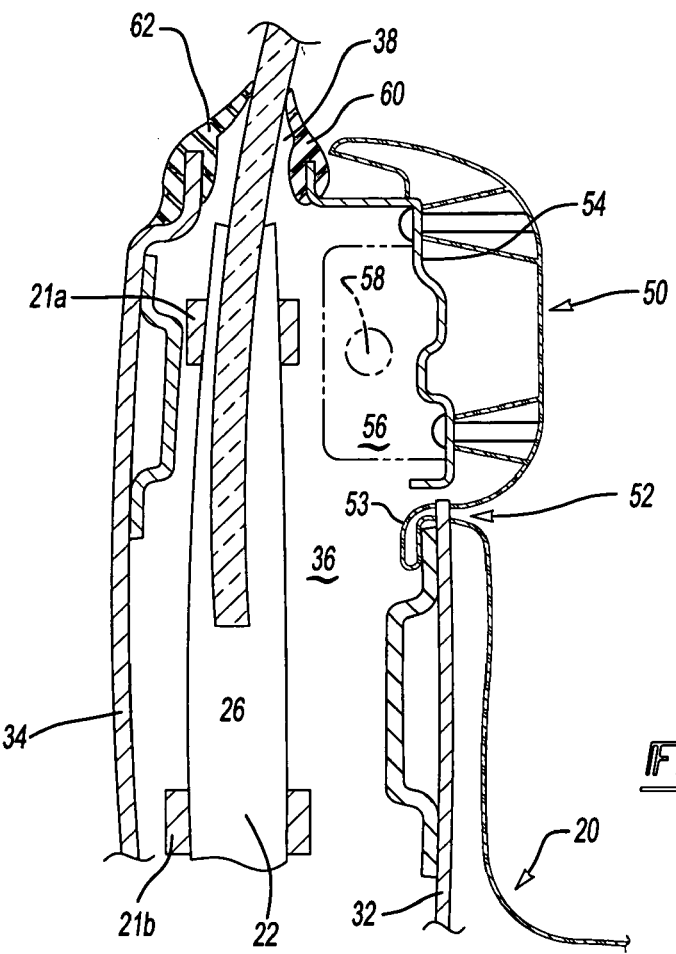
FIG. 6 is a mid sectional view of a modular door system with a moveable glass.

Referring to FIG. 6, once the door cassette 22 is secured into the cavity 36, the trim assembly 20 is located upon the door frame 18 with the hook 53. The attachment 55 is then secured to the door frame 18 (FIG. 1) with fasteners 57 or the like to secure the trim assembly 20 thereto. It should be understood that various attachments will benefit from the present invention.

Once the trim assembly 20 is secured, the hinged trim portion 50 is pivoted along the trim hinge 52 to close the open edge 38. The hinged trim portion 50 includes a reinforcement structure 54. It should be understood that various materials and constructions will benefit the reinforcement structure. The reinforcement structure defines a trim portion attachment 56 which is secured to the frame 18 with a trim fastener 58 or the like. Again, the fasteners are preferably readily accessible from the outside of the frame so as to permit access for an end user.

A seal 60 extends from the reinforcement structure 54. The seal 60, once the trim portion is secured, rides against the glass window 26 to provide a seal for the cavity 36. A fixed seal 62 extends from the door outer panel 34. The glass window 26 is movable therebetween.

Figure 7:
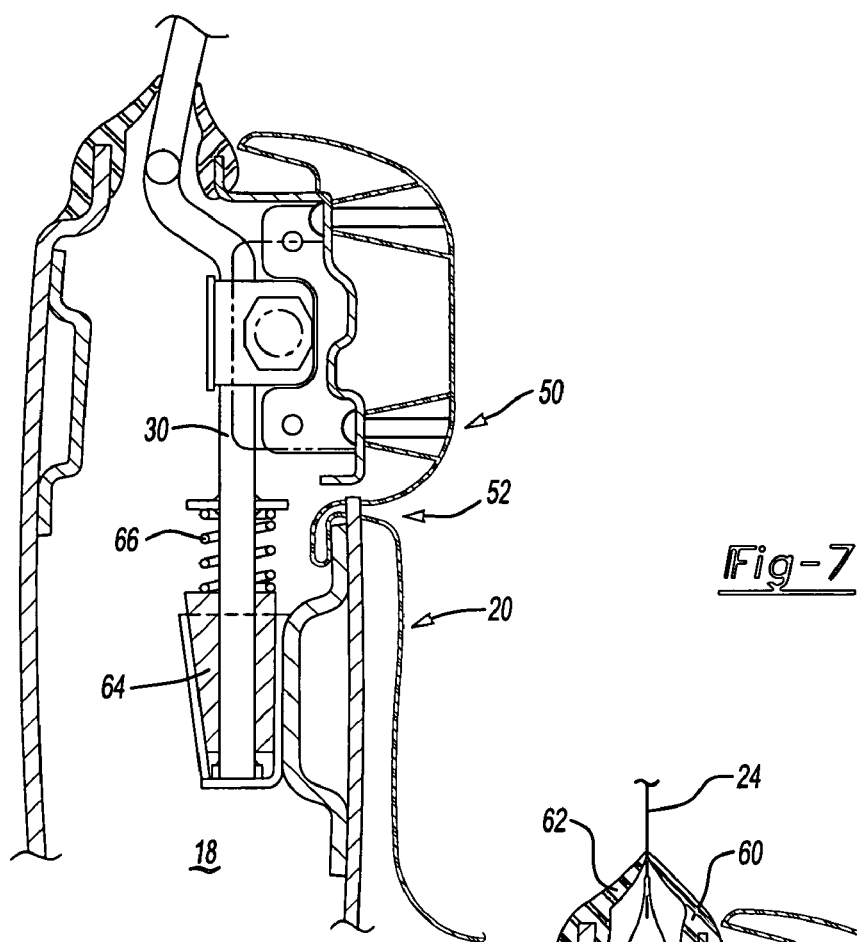
FIG. 7 is an end sectional view of a modular door system with a soft upper door assembly.
Figure 8:
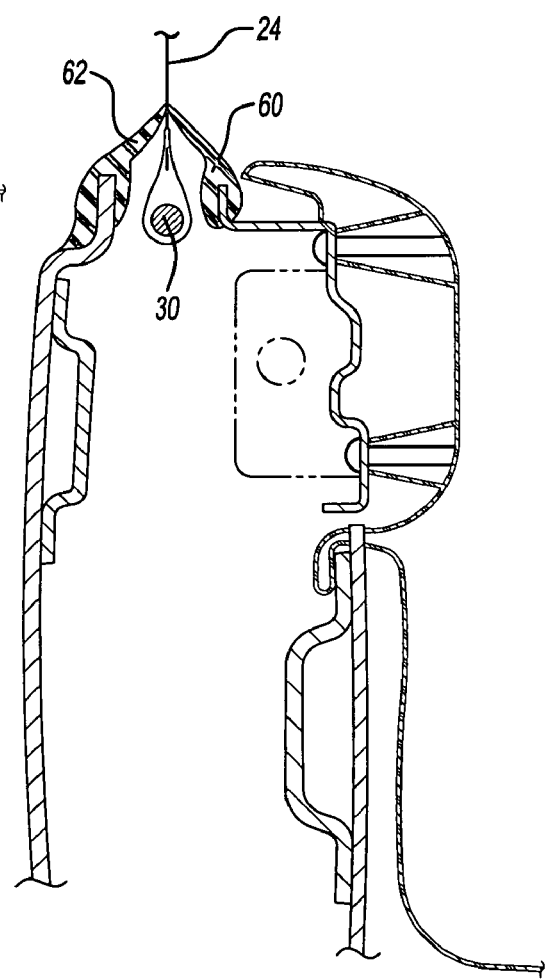
FIG. 8 is a mid sectional view of a modular door system with a soft upper door assembly of FIG. 7.

Referring to FIG. 7, the frame 30 of the curtain assembly is installed within mounts 64 located within the frame 18 and the trim assembly 20 is secured as described above. Preferably, the mounts 64 are located on the inside of the front face 40 and rear face 42 of the frame 18. A biasing assembly 66 such as a spring or the like provides a resilient interface between the frame 30 and the mounts 64 to minimize vibration and noise. The curtain assembly 24 is thereby retained between the seals 60, 62 (FIG. 8) as described above.

Even without an upper door portion, the seals 60, 62 will effectively touch each other thereby sealing the cavity 36. No separate seal member is required.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A vehicle door system comprising:
   a lower door assembly defining a cavity, said cavity open adjacent an edge of said lower door assembly;
   an upper door assembly at least partially receivable within said cavity; and
   a trim assembly mountable to said lower door assembly, said trim assembly comprising a hinged trim portion movable to engage said upper door assembly and at least partially seal said cavity.

2. The vehicle door system as recited in claim 1, wherein said hinged trim portion comprises a living hinge.

3. The vehicle door system as recited in claim 1, wherein said hinged trim portion is defined substantially parallel to said edge.

4. The vehicle door system as recited in claim 1, wherein said upper door assembly comprises a door cassette.

5. The vehicle door system as recited in claim 4, wherein said door cassette comprises a movable glass window.

6. The vehicle door system as recited in claim 1, wherein said upper door assembly comprises a side curtain assembly.

7. The vehicle door system as recited in claim 1, wherein said hinged trim portion comprises a reinforcement structure.

8. The vehicle door system as recited in claim 7, further comprising a seal extending from said reinforcement structure.

9. The vehicle door system as recited in claim 1, wherein said lower door assembly comprises a frame.

10. The vehicle door system as recited in claim 9, wherein said trim assembly comprises a hook engageable with said frame.

11. The vehicle door system as recited in claim 10, wherein said hook is adjacent said hinged trim portion.

12. The vehicle door system as recited in claim 9, wherein said trim assembly comprises an attachment engageable with said frame.

* * * * *